United States Patent [19]

Erickson et al.

[11] Patent Number: 4,942,826
[45] Date of Patent: Jul. 24, 1990

[54] VEHICLE HAVING VARIABLE GAUGE RAIL WHEELS

[75] Inventors: Warren R. Erickson, LaGrange, Ga.; Robert L. Siewert, Loudon, Tenn.

[73] Assignee: Trackmobile, Inc., LaGrange, Ga.

[21] Appl. No.: 336,901

[22] Filed: Apr. 12, 1989

[51] Int. Cl.⁵ .................. B61F 7/00; B61D 15/00
[52] U.S. Cl. ................... 105/178; 105/215.2; 295/36.1; 295/40
[58] Field of Search ............ 105/178, 215.1, 215.2; 295/36.1, 38, 37, 39, 40, 42.1

[56] References Cited

U.S. PATENT DOCUMENTS 4,534,297  8/1985  Johnson, Sr. ............ 105/215.2

FOREIGN PATENT DOCUMENTS 2738046  3/1978  Fed. Rep. of Germany ...... 105/178

Primary Examiner—Andres Kashnikow
Assistant Examiner—Mark T. Le
Attorney, Agent, or Firm—Allegretti & Witcoff, Ltd.

[57] ABSTRACT

Rail wheels and road wheels of vehicles may be easily modified to differing axle lengths, so that, typically, the vehicle may roll on rails of differing gauges. An easily installable and removable spacer is provided to the axle systems of the vehicle.

14 Claims, 2 Drawing Sheets

VEHICLE HAVING VARIABLE GAUGE RAIL WHEELS

TECHNICAL FIELD

In various parts of the world different gauges of railroad (i.e., widths) of railroad track are used. For example, in Spain, Portugal, and the Soviet Union, the gauges of railroad track are different from that of the corresponding tracks of Central Europe.

Accordingly, it becomes necessary to transfer cargos from one set of railroad cars to another in many circumstances of cross-border railroad shipping. One solution to this problem is to provide a three-track railroad track system, so that trains of two different axle lengths may run on the same track. This of course is quite expensive.

As an additional problem, the manufacturing specifications for railroad rolling stock must naturally be varied to conform to the specific gauges of railroad track upon which they are intended to operate. It would thus be desireable to provide railroad rolling stock which can be easily and simply modified to operate on different gauges of tracks. Particularly in the case of specialty vehicles such as mobile railcar movers this would be desirable. For example, such railcar movers may be used in a railroad yard at the border between two systems having different track gauges. In such a circumstance, it would be desirable to have the relatively small stock of railcar movers capable, with simple modification, to function on either gauge of railroad track, to increase their versatility.

This is especially so with respect to railcar movers which have a set of rail wheels and a set of road wheels, relatively retractable with respect to each other, to permit the railcar mover to move along the ground from track to track. Such a vehicle could most desirably be used at one period of time in conjunction with a track system of one gauge, and then moved to a track system of the other gauge.

By this invention, a system for easy modification of the axle length of railroad stock is provided, particularly for railcar movers having both rail and road wheels, but also with any railroad rolling stock as may be desired.

DESCRIPTION OF THE INVENTION

In one aspect of this invention, a method is provided for adapting an axle system of a vehicle which carries rail wheels to roll on rails of differing widths. The method comprises the steps of: separating an outer axle housing from an inner, main axle housing of the vehicle and removing a first axle shaft carried therein, where present. One then places a typically tubular spacer of desired width between the outer axle housing and the inner, main axle housing, then securing the spacer to each of the housings. One inserts a second axle shaft (when such shaft is used) through the outer axle housing, the spacer, and the inner, main axle housing, and one attaches the rail wheels into their appropriate positions in the axle system. When present, the second axle shaft has a length that exceeds the length of the first axle shaft by an amount substantially equal to the desired width of the tubular spacer.

Accordingly, the spacing between the rail wheels may be increased by this relatively simple modification method, while at the same time no decrease in their functioning is noted. It becomes a simple matter to reverse the process to remove the spacer, thus once again reducing the length of the axle system to permit the vehicle to roll on railroad track of its original gauge.

By this method, for example, it becomes possible to vary a vehicle so that it can operate on either a standard track gauge of 56 ½ inches, or a larger, 66 inch track gauge, or any other track gauge as may be desired.

It is particularly preferred to use the method of this application on a vehicle such as a mobile railcar mover which carries road wheels on a second axle system. In this instance, the following added steps may be performed: one separates an outer, road wheel-carrying axle portion of the second axle system from an inner, main axle portion of the second axle system. One then places a second spacer of desired width between the second outer axle portion and the second inner main axle portion, followed by securing the second spacer to each of the second, out and inner axle portions.

As is conventional, drive means may be carried by the rail wheels of the vehicle, the drive means being positionable to engage peripheries of the road wheels for providing motive power to the road wheels. The desired widths of the first and second spacers typically are, in this circumstance, substantially equal. As a result of this, the rail wheels and the road wheels remain in substantially similar relative lateral relation to each other after installation of the spacers, although both the rail wheel and road wheel axles are then of increased length. This permits the drive means of the rail wheels to continue to engage the peripheries of the road wheels while being adapted for track of larger gauge.

The method of this application is preferably used with railcar moving vehicles or the like that carry at least two rail wheel axles and two road wheel axles, one of the sets of rail wheel or road wheel axles being raiseable and lowerable to permit selective, alternating suspension of the rail wheels and the road wheels out of supporting engagement with the ground.

DESCRIPTION OF SPECIFIC EMBODIMENTS

Figure 1:
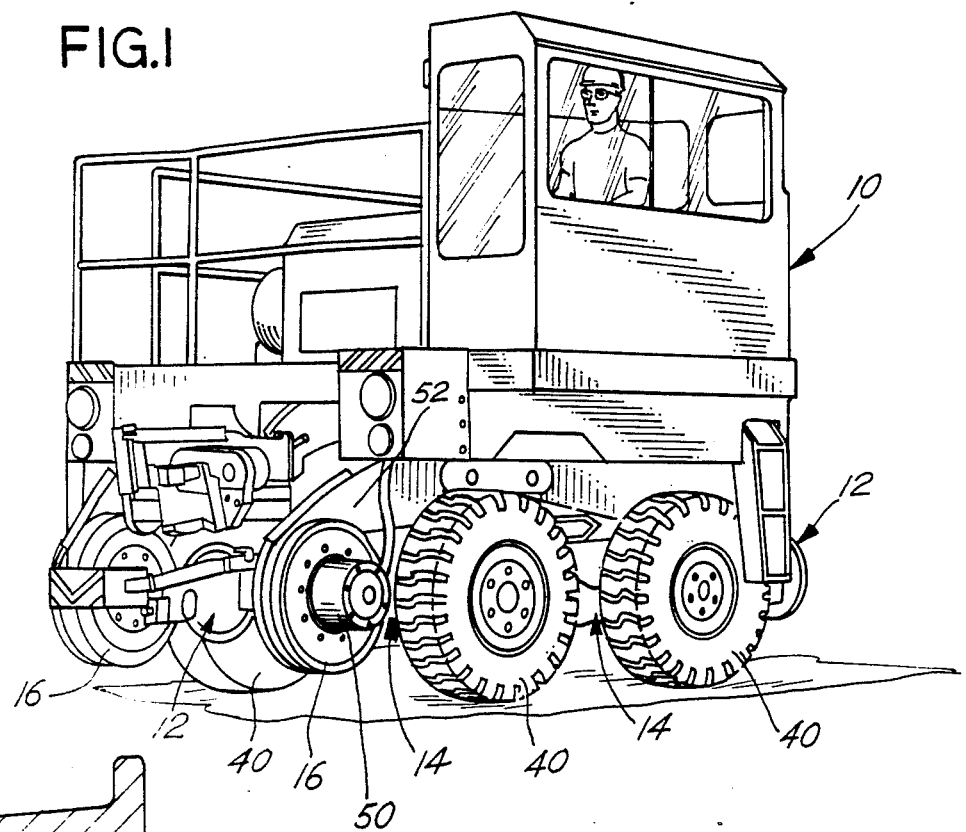
FIG. 1 is a perspective view of a railcar moving vehicle having a set of road wheels and a set of retractable rail wheels, using the invention of this application.

Referring to the drawings, a railcar moving vehicle 10 is disclosed, having two axle systems 12 of rail wheels, which axle systems are retractable in conventional manner, as shown, and two axle systems of road wheels 14. Road wheels 14 may be raised upwardly off of the ground by forcefully lowering axle systems 12, so that the vehicle may operate on railroad track with the rail wheels of axle systems 12 being the only contact with the ground. Such railcar moving vehicles are known, one example of such being the 95TM Trackmobile Road/Rail Vehicle, sold by Trackmobile, Inc. of LaGrange, Ga.

Figure 2:
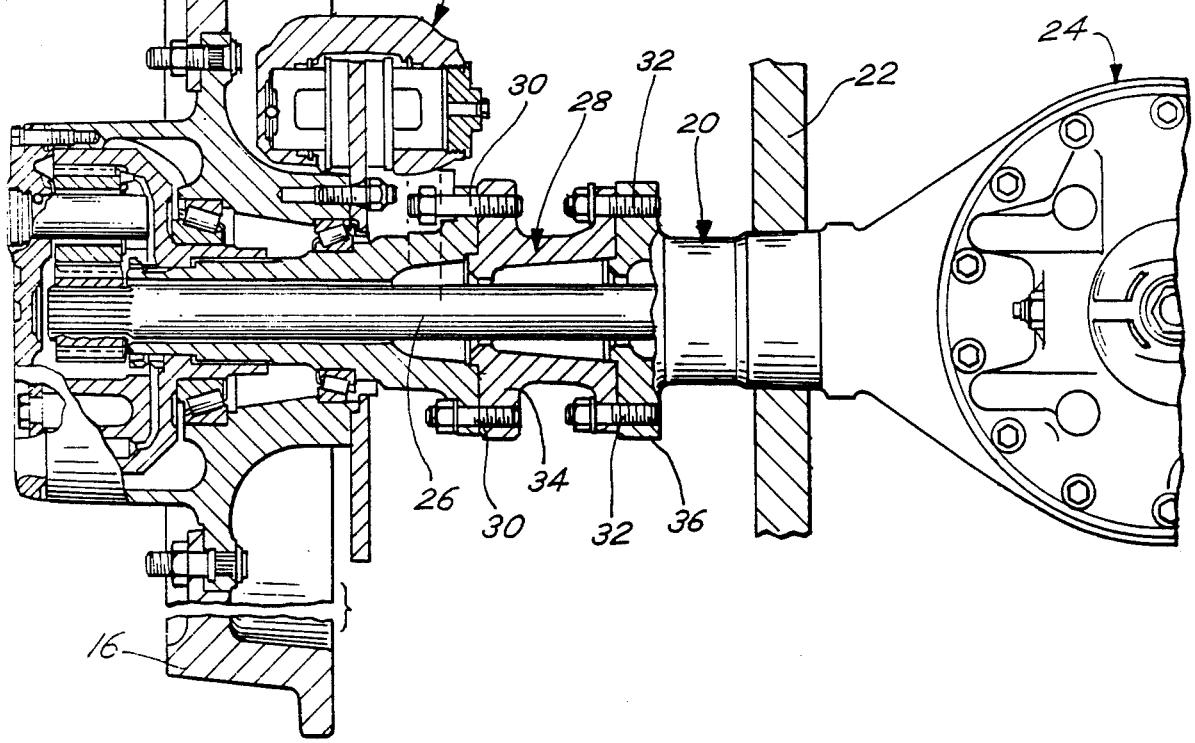
FIG. 2 is a longitudinal sectional view of a portion of the rail wheel axle system of the vehicle of FIG. 1 modified in accordance with this invention.

FIG. 2 shows one side of rail wheel axle system 12 of the vehicle 10 which mounts rail wheels 16 in the manner as shown. Except as otherwise described herein, axle system 12 may be of conventional design, comprising outer axle housing 18, which is connected to inner, main axle housing 20, which is attached to the frame 22 of the vehicle and which connects with a conventional differential 24.

Axle shaft 26 is provided as shown for its normal function.

In accordance with this invention, one may increase the overall length of each of axle systems 12 to permit rail wheels 16 to engage wider gauge track systems. This is accomplished by unbolting outer axle housing 18 from the inner, main axle housing 20 and removing a first axle shaft, corresponding to axle shaft 26, which is carried therein. One then places tubular spacer 28 of a desired width to increase the length of each axle system 12, to cause wheels 16 to engage the larger gauge track.

As shown, generally tubular spacer 28 is positioned between outer axle housing 18 and main axle housing 20, and secured to each of these axle housings by respective bolts 30, 32 which pass through the conventional bolt holes of the respective axle housings, and also through apertures defined in respective end flanges 34, 36 of tubular spacer 28. At an appropriate time in this process, second axle shaft 26 is inserted through outer axle housing 18, tubular spacer 28, and inner, main axle housing 20. The second axle shaft 26 has a length that exceeds the first axle shaft by an amount substantially equal to the width of tubular spacer 28.

Thus, an operative axle system is easily provided, being of greater length than the former axle system, to permit operation of the same vehicle on a wider gauge railroad track. Thereafter, if it is desired to return the vehicle to the narrower gauge railroad track, or to any other gauge of railroad track, one simply reverses the process described above, removing spacer 28 or replacing it with a different width of spacer, for relatively simple adjustment of rail wheel widths. The process is easily accomplished outside of a shop because the rail wheels can be lifted off the ground, with few other tools being required than a wrench to unbolt and rebolt the respective parts. Hence, the vehicle, as modified by this invention, can operate on trackage of multiple gauges, for efficient, versatile use thereof as changing circumstances may find desirable.

Figure 3:
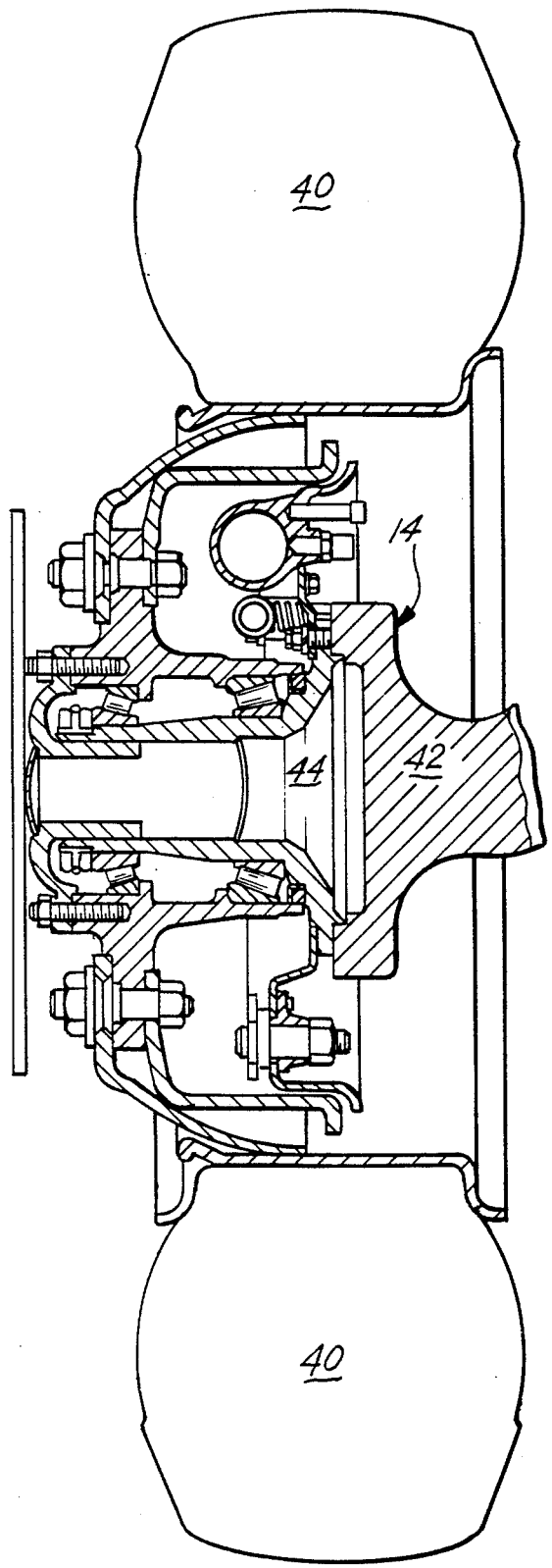
FIG. 3 is a longitudinal sectional view of a portion of the road wheel axle system of the vehicle of FIG. 1, prior to the modification in accordance with this invention.
Figure 4:
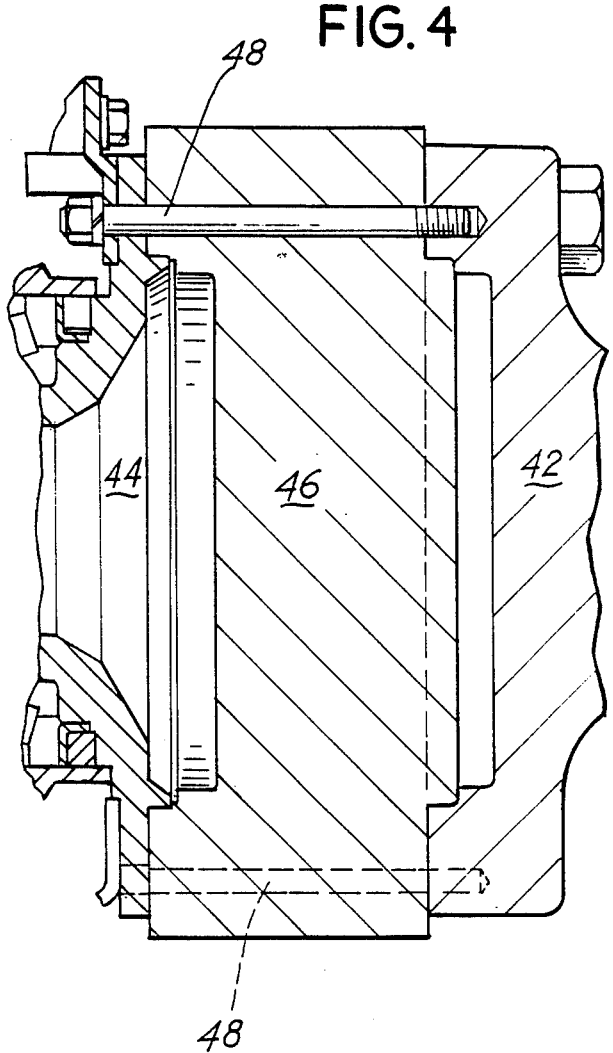
FIG. 4 is an enlarged, fragmentary sectional view, showing the modification in accordance with this invention.

Turning to FIGS. 3 and 4, novel details of the road wheel axle system are shown. As shown particularly in FIG. 3, a conventional road wheel axle system 14 is shown, prior to modification as in this invention, carrying balloon tire road wheels 40. Road wheel axle system 14 carries an inner, main axle portion 42, and an outer axle portion 44, such inner and outer axle portions being of conventional design.

In accordance with this invention, a second spacer 46 of predetermined width is placed between inner main axle portion 42 and outer axle portion 44, being held together as appropriate by bolts 48 which may connect the three sections 42, 44, 46.

Preferably, the width of spacer 46, which is shown as a plate but may also be a tubular spacer if desired, is preferably predetermined to match the width of first spacer 28. As a result of this, the presence of the respective spacers 28, 46 results in an equal increase of outer extension of the respective rail wheels 16 and road wheels 14, so that the respective rail and road wheels retain the same lateral relation to each other in their expanded position as in the original position. Thus, it remains possible for driving lugs 50 (FIG. 1) to be brought into engagement with the periphery of their respective, associated road wheels by movement of pivot arm 52 in conventional manner to drive the road wheels, when desired.

As is conventional, rail wheels 16 and axle system 12 may be lowered by arm 52 so that rail wheels 16 engage railroad track, and lift wheels 40 out of engagement with the ground. The apparatus permits either the rail wheels or the road wheels to be in engagement with the ground to permit selective, alternating suspension of the rail wheels and the road wheels upwardly out of ground-supporting engagement.

Accordingly, a railcar moving vehicle is provided which can be easily modified, without special equipment or need for a shop, to operate on tracks of differing gauges.

One of the sets of wheels 16, 40 may be lifted out of contact with the ground. The axle system of such wheels may be unbolted, to respectively add or remove a spacer such as spacers 28 or 46, and the axle system may then be rebolted together. Following this, the other of the axle systems may be modified in similar manner so that, preferably, the rail wheels and road wheels remain in the same lateral relationship to each other while being adapted for use with rails of differing gauges.

The above has been offered for illustrative purposes only, and is not intended to limit the scope of the invention of this application, which is as defined in the claims below.

That which is claimed is:

1. The method of adapting an axle system of a vehicle which carries rail wheels to roll on rails of differing width, which comprises:

separating an outer axle housing from an inner, main axle housing of the vehicle and removing a first axle shaft carried therein; placing a tubular spacer of desired width between said outer axle housing and inner, main axle housing, and securing the spacer to each of said housings; inserting a second axle shaft through said outer axle housing, spacer, and inner, main axle housing, said second axle shaft having a length that exceeds the length of the first axle shaft by an amount substantially equal to said desired width of the tubular spacer.

2. The method of claim 1 in which said vehicle also carries road wheels on a second axle system, and including the added steps of:

separating an outer road wheel-carrying axle portion of the second axle system from an inner, main axle portion of the second axle system; placing a second spacer of desired width between said second, outer axle portion and second, inner main axle portion and securing the second spacer to each of said second axle portions.

3. The method of claim 2 in which drive means are carried by said rail wheels, said drive means being positionable to engage peripheries of said road wheels, the desired width of said first and second spacers being substantially equal whereby said rail wheels and road wheels remain in substantially similar relative lateral relation to each other after installation of said spacers, to permit the drive means of the rail wheels to engage the peripheries of said road wheels.

4. The method of claim 3 in which said vehicle carries at least two of said axles carry rail wheels and at least two of said axles which carry road wheels, said rail wheel and road wheel axles being raiseable and lowerable relative to each other to permit selective, alternating suspension of the rail wheels and the road wheels upwardly out of supporting engagement with the ground.

5. The method of claim 1 in which said vehicle carries at least two of said axle systems carrying rail wheels and at least two of said second axle systems carrying road wheels, said rail wheel and road wheel axle systems being raiseable and lowerable relative to each other to permit selective, alternating suspension of the rail wheels and the road wheels upwardly out of supporting engagement with the ground.

6. In a vehicle which comprises at least two axles which carry rail wheels and at least two axles which carry road wheels, and means for raising and lowering said rail wheel and road wheel axles relative to each other to permit selective, alternating suspension of the rail wheels and the road wheels upwardly out of supporting engagement with the ground, said rail wheel axles defining an inner, main axle housing and an outer axle housing, the improvement comprising, in combination:

a spacer of desired width secured to the outer axle housing and inner, main axle housing and positioned therebetween to longitudinally separate said outer and inner housings.

7. The vehicle of claim 6 in which at least one of said road wheel axles comprises an outer axle portion and an inner, main axle portion, and a second spacer of desired width positioned between said outer and inner axle portions and secured thereto.

8. The vehicle of claim 7 in which said rail wheel axle system is connected to rail wheels carried on a track, said rail wheels carrying drive means which are positionable to engage the peripheries of said road wheels, the width of the road wheel axle carrying said engageable road wheels being sufficient to permit the drive means to engage the peripheries of said road wheels for driving of said road wheels by said rail wheels when the rail wheels are retracted off of the ground and the road wheels engage the ground.

9. The vehicle of claim 8 which includes an axle shaft extending through said outer axle housing, said spacer, and said main axle housing, said spacer being of generally tubular shape.

10. The vehicle of claim 6 which includes an axle shaft extending through said outer axle housing, said spacer, and said main axle housing, said spacer being of generally of tubular shape.

11. The method of adapting an axle system of a vehicle which carries rail wheels to roll on rails of differing width, which comprises:

separating an outer axle housing from an inner, main axle housing of the vehicle; placing a spacer of desired width between said outer axle housing and inner, main axle housing, and securing the spacer to each of said housings, whereby said rail wheels are spaced from each other on opposed outer axle housings by an increased, predetermined distance.

12. In a vehicle which comprises at least two axles which carry rail wheels and at least two axles which carry road wheels, and means for raising and lowering said rail wheel and road wheel axles relative to each other to permit selective, alternating suspension of the rail wheels and the road wheels upwardly out of supporting engagement with the ground, said rail wheel axles defining an inner, main axle housing and an outer axle housing, the improvement comprising, in combination:

a first spacer of desired width secured to the outer axle housing and inner main axle housing of the rail wheel axles and positioned therebetween; at least one of said road wheel axles comprising an outer axle portion and an inner, main axle portion, and a second spacer of desired width positioned between said outer and inner axle portions and secured thereto.

13. The vehicle of claim 12 in which said rail wheel axles are connected to rail wheels, said rail wheels carrying drive means which are positionable to engage the peripheries of said road wheels, the width of the road wheel axle carrying said engagement road wheels being sufficient to permit the drive means to engage the peripheries of said road wheels for driving of said road wheels by said rail wheels when the rail wheels are retracted off of the ground and the road wheels engage the ground.

14. The vehicle of claim 13 which includes an axle shaft extending through said outer axle housing, said spacer, and said main axle housing, said spacer being of generally tubular shape.

* * * * *